United States Patent
Petersson

(10) Patent No.: US 6,763,003 B1
(45) Date of Patent: Jul. 13, 2004

(54) OPTIMIZED TONE SENDING IN AN ATM SATELLITE NETWORK

(75) Inventor: Stefan Petersson, Frisco, TX (US)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/536,899

(22) Filed: Mar. 28, 2000

(51) Int. Cl.[7] ............... H04L 12/56; H04L 12/66; H04B 7/185

(52) U.S. Cl. ........... 370/310.2; 370/312; 370/338; 370/390; 370/399; 370/401; 370/432; 370/525; 455/445

(58) Field of Search ............... 370/310.2, 312, 370/316, 338, 352, 356, 389, 390, 395.1, 398, 399, 400, 401, 409, 432, 522, 525; 379/88.17, 88.24, 221.14, 221.15; 455/445, 450, 12.1, 13.1, 38.1, 38.2

(56) References Cited

U.S. PATENT DOCUMENTS

| 5,943,319 | A | * | 8/1999 | Fraser ................. 370/259 |
| 6,112,085 | A | * | 8/2000 | Garner et al. ........... 455/428 |
| 6,195,714 | B1 | * | 2/2001 | Li et al. ............... 710/31 |
| 6,262,992 | B1 | * | 7/2001 | Nelson et al. .......... 370/426 |
| 6,266,342 | B1 | * | 7/2001 | Stacey et al. .......... 370/465 |
| 6,298,064 | B1 | * | 10/2001 | Christie ............... 370/410 |
| 6,535,507 | B1 | * | 3/2003 | Li et al. .............. 370/356 |

\* cited by examiner

Primary Examiner—Alpus H. Hsu

(57) ABSTRACT

Permanent virtual channels are set-up, each broadcasting a select audio tone of a number of audio tones. When a terminal requests a call set-up, the identification of the appropriate permanent virtual channel to which the terminal is to listen, depending on the situation, is transmitted to the terminal from the network control center. The tone generating equipment is located in the network control center.

11 Claims, 3 Drawing Sheets

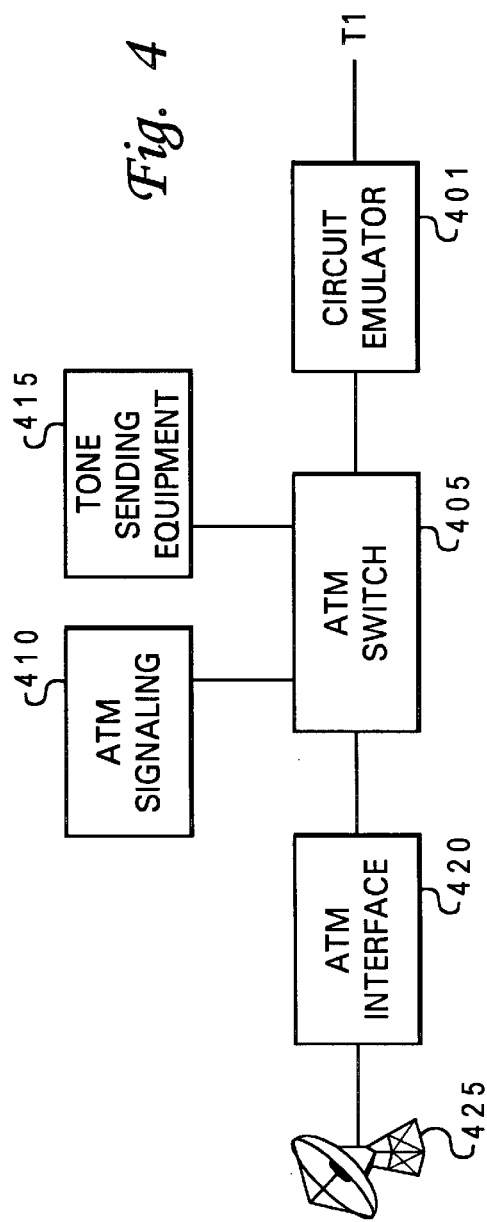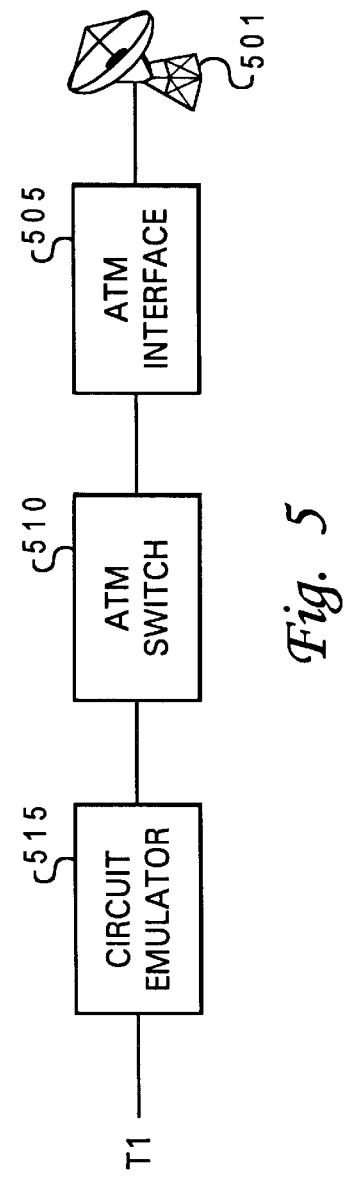

OPTIMIZED TONE SENDING IN AN ATM SATELLITE NETWORK

BACKGROUND OF THE INVENTION

I. Field of the Invention

The present invention relates to satellite communications. More particularly, the present invention relates to the transmission of audio tones in an asynchronous transfer mode satellite network.

II. Description of the Related Art

Typically, cellular telephones emit various audio tones to indicate the status of a telephone call. For example, a "congested" tone indicates that the system cannot take additional traffic and a "busy" tone indicates that the called party's telephone is off-hook. These tones give the subscriber feedback on various operations of the telephone.

In order to transmit these audio tones in an asynchronous transfer mode (ATM) based satellite network that is designed to support switched voice traffic, separate virtual ATM channels are used to send a tone to the subscriber. This ties up a substantial amount of bandwidth that cannot be used for other voice traffic. This decreases the revenue generating resources of the service carrier. Additional equipment is also needed to transmit these tones. There is a resulting need for an optimized process for transmitting tones in an ATM network.

SUMMARY OF THE INVENTION

The present invention encompasses a process for providing an audio tone to a remote terminal. The remote terminal has access to at least one broadcast tone that has a unique identification associated with each tone. The remote terminal has communication capability with a control center.

The process begins by the control center receiving a request from the remote terminal to set up a call. At this point, the control center may be experiencing congestion and cannot grant the call set-up request.

The control center then informs the remote terminal of the identification of a broadcast tone communication path in response to the call set-up request. The remote terminal watches for this identification in the received ATM cells to find the tone.

BRIEF DESCRIPTION OF THE DRAWINGS

FIG. 4 shows a functional block diagram of a network control center of the present invention.

FIG. 5 shows a functional block diagram of a terminal of the present invention.

DETAILED DESCRIPTION OF THE PREFERRED EMBODIMENT

The present invention provides an audio tone to subscribers over an ATM based satellite network that supports switched voice traffic. This is accomplished without the need for additional equipment for sending the tones. The present invention also reduces the required bandwidth, thus freeing bandwidth for voice traffic.

The tones of the present invention include a busy tone and a congestion tone. The busy tone indicates to the calling party that the called party is busy. The congestion tone indicates to the calling party that the call cannot be completed due to a lack of network resources. Alternate embodiments use other tones that are encompassed by the present invention.

Figure 1:
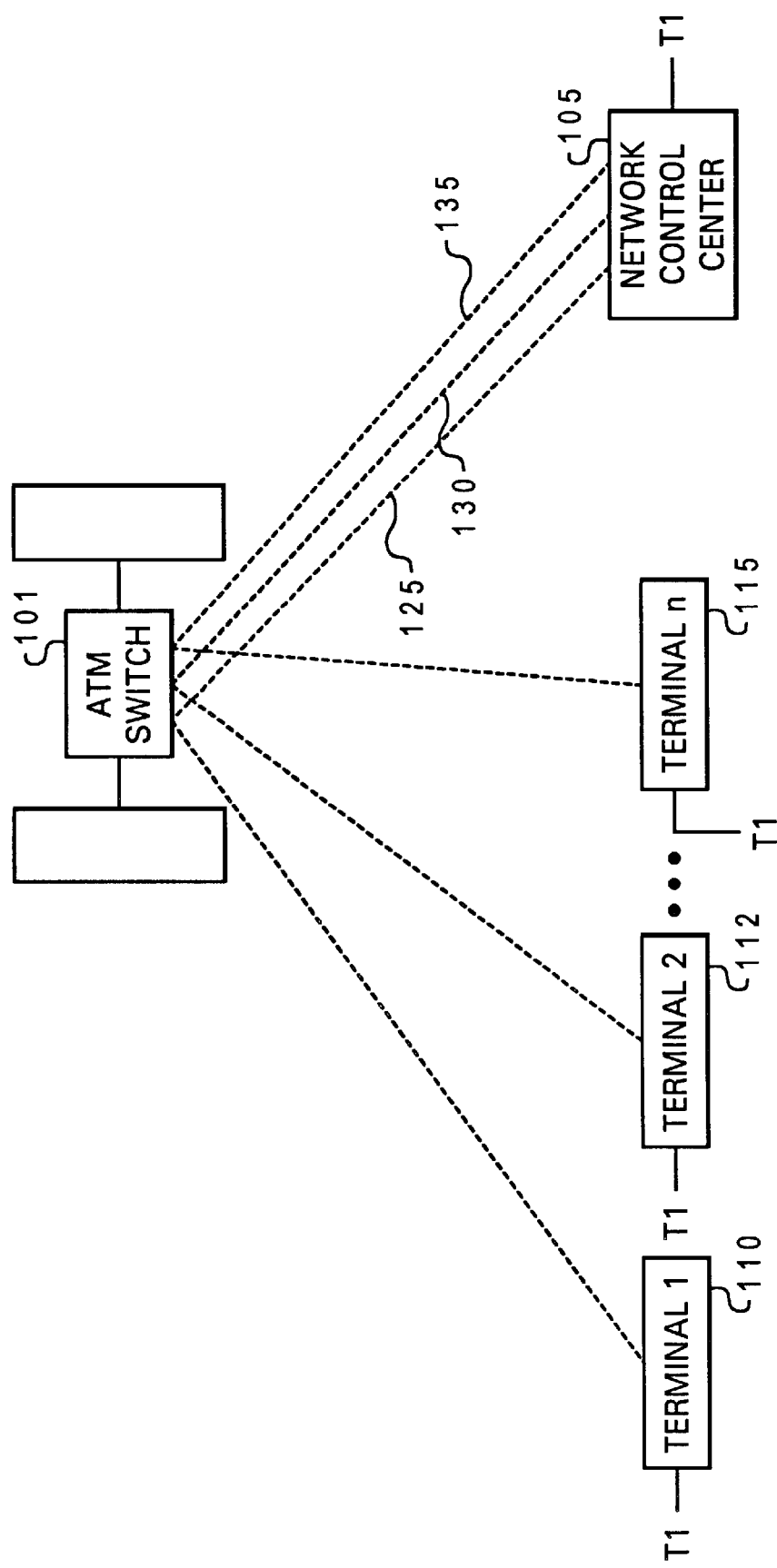
FIG. 1 shows a diagram of the communication system of the present invention.

FIG. 1 illustrates a preferred embodiment tone sending system of the present invention. This system is comprised of a satellite (101) that relays signals from the network control center (105) to terminals 1–n (110, 112, and 115).

The satellite (101) of the present invention is comprised of an ATM switch. As is well known in the art, the ATM switch is responsible for routing cells through the network. In the present embodiment, the ATM switch in the satellite (101) is responsible for routing cells from the network control center (105) to the proper terminal (110, 112, or 115) and also from terminals 1–n (110, 112, or 115) to the network control center (105).

The network control center (105) is responsible for taking data from various networks, formatting the data, and transmitting the formatted data to the satellite. The network control center (105) has a gateway that couples the control center (105) to T1 terrestrial links. The T1 links can go to various networks such as the public switched telephone network (PSTN), Integrated Services Digital Network (ISDN), an Internet Protocol network, an ATM network, or other types of networks.

The network control center (105) is considered a service access point for the ATM network. The network control center (105) has the addressing for all of the terminals (110, 112, and 115). It is responsible for routing a signal to the appropriate terminal by sending the address back to the satellite's ATM switch.

The functional composition of the network control center (105) is illustrated in FIG. 4. The network control center is comprised of a circuit emulation interface (401) that interfaces the control center to the T1 links of the terrestrial network. The circuit emulation interface (401) is the gateway responsible for generating the signals required for interfacing the control center to the T1 links. This interface is responsible for generating the appropriately formatted data for the different types of networks (e.g., ISDN, IP, ATM, and PSTN) coupled to the network control center.

The circuit emulation interface (401) is coupled to an ATM switch (405) that provides the ATM switching function for the control center. An ATM signaling function (410) and tone sending function (415) are also input to the ATM switch. Inputting the tone to the ATM switch enables the switch to route the tone to the appropriate virtual channel.

The output of the ATM switch (405) is input to the ATM interface (420) that interfaces the network control center to the antenna (425). The antenna (425) is responsible for transmitting and receiving signals with the satellite.

In alternate embodiments, network control centers having different functional block diagrams may be substituted while still being encompassed by the present invention. Any network control center having tone generating equipment and communication capability with various networks can be used in the present invention. Even though a satellite is illustrated as the means for relaying and routing a signal from the network control center, a terrestrial means for relaying and routing may be substituted.

Terminals 1–n (110, 112, and 115) have satellite receive and transmit capability. While only three terminals (110, 112, and 115) are shown in FIG. 1 for clarity purposes, it is possible to have hundreds of thousands of terminals in one satellite footprint. The terminal is coupled to various networks such as the PSTN, ISDN, IP networks, ATM networks, or other types of networks.

A functional block diagram of each of terminals 1–n (110, 112, or 115) is illustrated in FIG. 5. Each terminal is comprised of an antenna (501) for communicating with the satellite. The antenna (501) is coupled to an ATM interface (505) that provides an interface between the ATM switch (510) and the antenna (501). The circuit emulator, coupled to the ATM switch (510), provides the gateway for interfacing the terminals to the T1 links.

In alternate embodiments, terminals having different functional block diagrams may be substituted while still being encompassed by the present invention. Any terminal having communication capability, whether satellite or otherwise, can be used in the present invention.

Referring again to FIG. 1, terminals 1–n (110, 112, and 115) communicate with the network control center (105) over virtual channels (125, 130 and 135). These channels (125, 130, and 135) are a communication link that provides for the sequential, unidirectional transfer of ATM cells. In the preferred embodiment, the virtual channels have a bandwidth of 64 kbps. Alternate embodiments have other bandwidths, such as a compressed 32 kbps.

Figure 2:
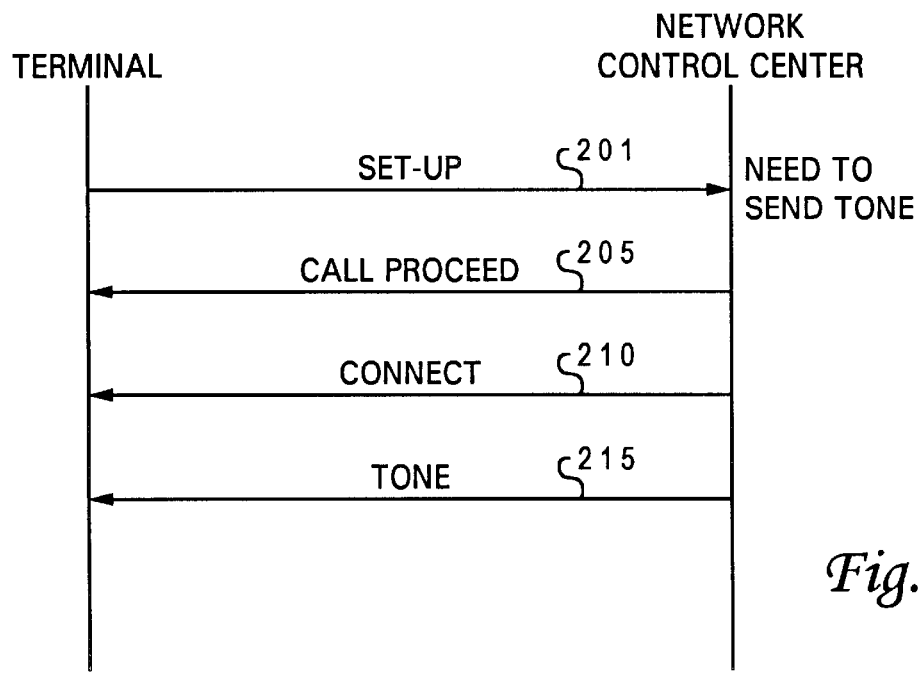
FIG. 2 shows a signaling diagram in accordance with the present invention.

The virtual channels are set up by signaling between the control center and a terminal. An example of the preferred embodiment of this signaling is illustrated in FIG. 2.

The signaling is comprised of the terminal requesting a call set-up (201) with the control center. The control center sends a message back (205) to the terminal instructing the call to proceed. The control center then sends another message (210) to the terminal instructing the terminal to connect to the control center using a predetermined virtual channel for the voice channel. This predetermined virtual channel is included in the message. For example, the control center may instruct the terminal to listen to virtual channel 10 (VC 10). In the alternative, the control center may instruct the terminal to listen to a particular channel for a tone (step 215). For example, the control center may instruct the terminal to listen to virtual channel 1 (VC1) for the tone.

In the preferred embodiment, the signaling is conducted over a switched virtual channel. The channel assignment is dynamic based on need at a particular time. This is in contrast to the permanent virtual channels that are assigned by the system operator when the system is set-up and manually assigned based on load.

In the present invention, the system operator sets up a permanent virtual channel for each tone type needed. The tone sending equipment is connected to each permanent virtual channel. The tones are now broadcast to all terminals over these permanent virtual tone channels and the terminals will hear the tones when the control center instructs them to connect to a particular one of the permanent virtual tone channels.

Figure 3:
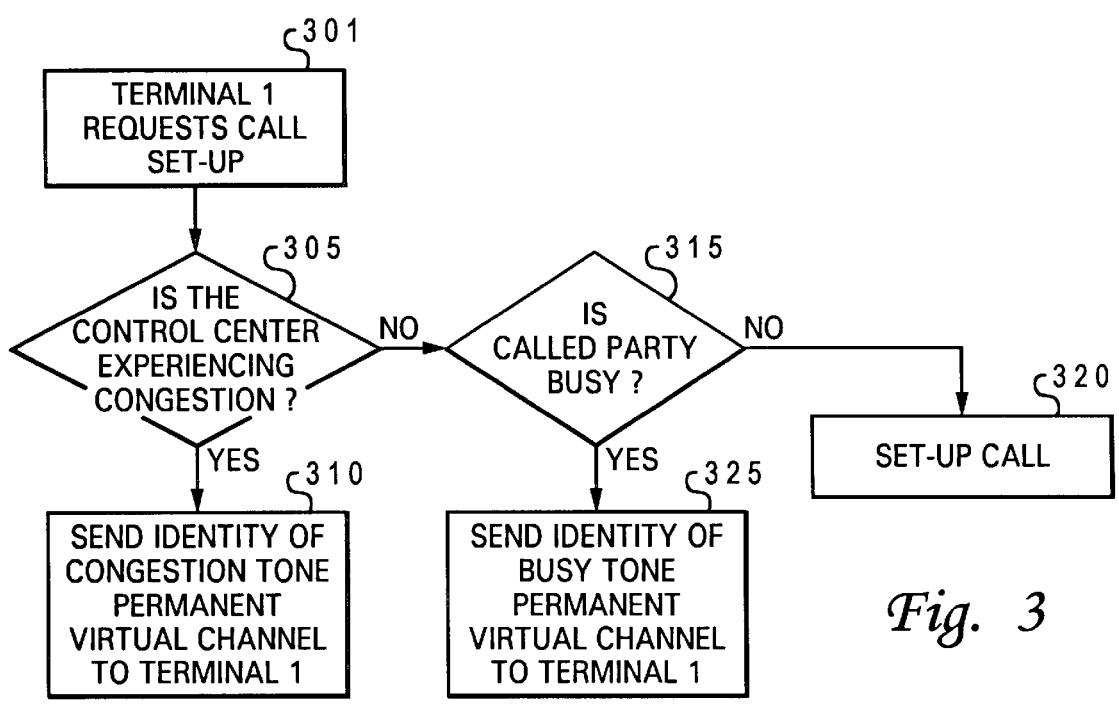
FIG. 3 shows a flow chart of the process of the present invention.

A process of the present invention is illustrated in the flowchart of FIG. 3. The process begins by a terminal, terminal 1 in this example, requesting a call to be set-up by the network control center (step 301). This is done by standard ATM switched virtual channel signaling as described above.

It is next determined if the network control center is experiencing congestion (step 305). If it is, the control center returns the identification (step 310), to terminal 1, of a permanent virtual channel that was set up to broadcast a congestion tone.

If the network control center is not experiencing congestion, it is determined if the called party is busy (step 315). If the called party is not busy, the call is set-up (step 320). If the called party is busy, the network control center sends, to terminal 1, the identification (step 325) of a permanent virtual channel that is broadcasting a busy tone.

The process of FIG. 3 does not detail the ATM processes required to route ATM cells from the initiation point to the destination. This switching process, as well as the format of the ATM cells, is well known in the art.

The above described process of FIG. 3 is an example of the implementation of the process of the present invention using congestion and busy tones. Alternate embodiments that use other tones will use alternate processes that include sending the identification of the virtual channel broadcasting the appropriate tone for the situation.

Using the process of the present invention, the tone generator equipment can be located in the network control center instead of in each terminal. Therefore, in addition to freeing bandwidth for calls, the present invention reduces the quantity of tone generator equipment required, thus greatly reducing the cost of each terminal.

I claim:

1. A method for providing an audio tone to a remote terminal, the remote terminal having access to at least one tone communication path being a permanent virtual channel, each tone communication path having a unique identification, the remote terminal additionally having communication capability with a control center, the method comprising the steps of:

the control center receiving a request from the remote terminal to set up a call; and the control center informing the remote terminal of the identification of a tone communication path to be listened by the remote terminal for a particular audio tone, of the at least one tone communication path, in response to the call set-up request.

2. The method of claim 1 and further including the step of the remote terminal communicating with the control center over a satellite communication channel.

3. The method of claim 1 and further including the step of the remote terminal receiving an audio tone, indicating call congestion at the control center, over the tone communication path.

4. The method of claim 1 and further including the steps of:

coupling the control center to a network gateway;

the control center communicating, through the network gateway, with a wide area network.

5. The method of claim 1 and further including the steps of:

coupling the control center to a network gateway; and the control center communicating, through the network gateway, with a local area network.

6. A method for providing an audio tone to a remote terminal, the remote terminal having access to a plurality of permanent virtual channels, each permanent virtual channel having a unique identifier, the remote terminal further communicating with a control center, the method comprising the steps of:

the remote terminal requesting the control center to set up a call; and the remote terminal receiving a signal from the control center indicating the unique identity of the permanent virtual channel to be listened to by the remote terminal for a particular audio tone in response to the call set-up request.

7. The method of claim 6 wherein the plurality of permanent virtual channels each broadcasts an audio tone wherein said remote terminal connects to a particular one of said plurality of permanent virtual channels to listen to said audio tone identified by said received signal.

8. A method for providing an audio tone to a remote terminal, the remote terminal having access to a plurality of permanent virtual channels, each permanent virtual channel having a unique identifier and broadcasting a tone, the remote terminal communicating with a control center over one of a plurality of non-permanent virtual channels, the method comprising the steps of:

the remote terminal signaling the control center, over one of the plurality of non-permanent virtual channels, to set up a call;

the control center granting the remote terminal an virtual channel; and the control center signaling the remote terminal with the unique identity of the permanent virtual channel in response to the call set-up request wherein said unique identity identifies a particular tone as broadcast by one of said plurality of permanent virtual channels to be listened by said remote terminal.

9. The method of claim 8 wherein the step of signaling the control center includes standard asynchronous transfer mode switched virtual channel signaling.

10. A system for providing an audio tone to a remote terminal, the remote terminal having access to a plurality of permanent virtual channels, each permanent virtual channel having a unique identifier, the remote terminal further communicating with a control center, comprising:

means for requesting the control center to set up a call from said remote terminal; and means for receiving a result signal from the control center indicating the unique identity of the permanent virtual channel to be listened to by the remote terminal for a particular audio tone in response to the call set-up request.

11. The system of claim 10 wherein the plurality of permanent virtual channels each broadcasts an audio tone wherein said remote terminal connects to a particular one of said plurality of permanent virtual channels to listen to said audio tone identified by said received result signal.

* * * * *